May 23, 1944.  W. L. HANSEN ET AL  2,349,620
METHOD OF FABRICATING ROTORS
Filed Dec. 2, 1940  2 Sheets-Sheet 1
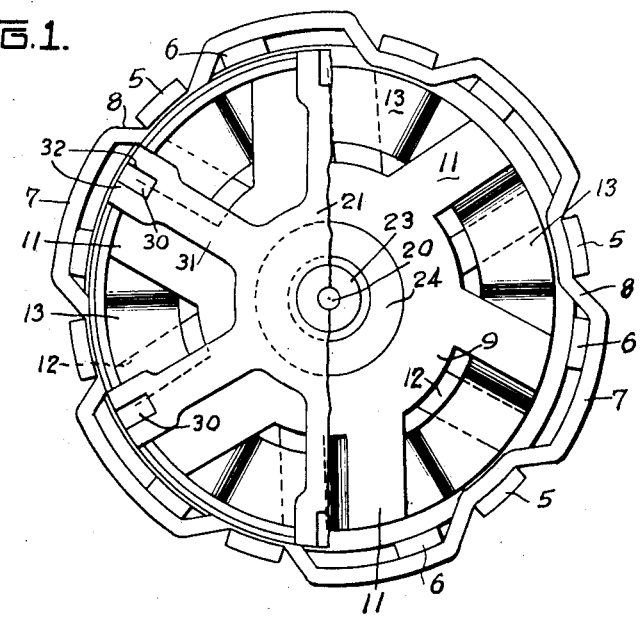
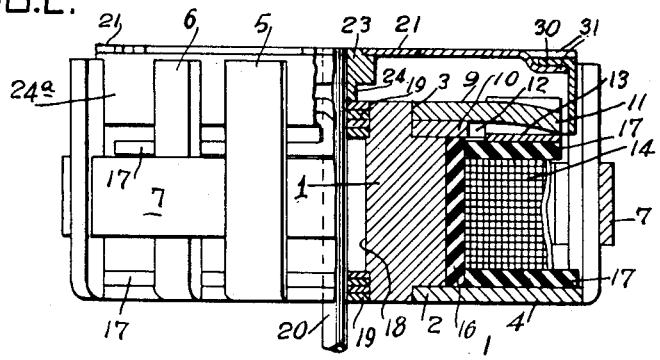
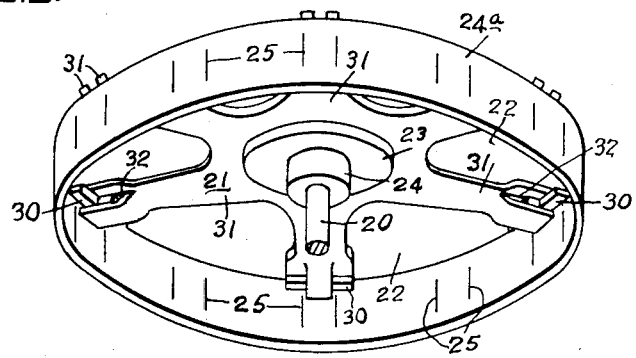
Inventors
WILLIAM L. HANSEN,
IRA N. HURST, May 23, 1944.  W. L. HANSEN ET AL  2,349,620
METHOD OF FABRICATING ROTORS
Filed Dec. 2, 1940   2 Sheets-Sheet 2

Inventors
WILLIAM L. HANSEN,
IRA N. HURST,
By
Attorneys

Patented May 23, 1944

2,349,620

UNITED STATES PATENT OFFICE 2,349,620

METHOD OF FABRICATING ROTORS

William L. Hansen and Ira N. Hurst, Princeton, Ind., assignors to Hansen Mfg. Company, Inc., Princeton, Ind., a corporation of Indiana Application December 2, 1940, Serial No. 368,138

7 Claims. (Cl. 29—155.53)

The present invention relates to synchronous motors, and more particularly to the rotor element thereof.

In the fabrication of synchronous motors it has been customary to provide a rotor formed out of spring strip magnetic material, the strip being provided with arcuate incisions while in flat form, and then sprung into circular shape and held in that shape by a flanged retaining member. Rotors of this type have given satisfactory performance, but it has been found that at the place where the two ends of the strip abut there is left a small air space which constitutes a virtual air gap, even when great precaution is taken to assure a complete contact over the entire areas of the abutting strip ends. This small but effective air gap represents a discontinuity of the magnetic circuit, of which the rotor forms a part, so that all parts of the rotor may not react in a strictly uniform manner to the magnetic fields produced by the pole pieces. It will be understood that these ends cannot normally be welded together without increasing the thickness of the rotor at the place of the weld, or without causing deleterious effects within the metal of the rotor introduced by the heat of the weld.

In addition to the disadvantage mentioned above, a further consideration is the fact that a rotor formed of spring strip metal and sprung to a circular configuration requires considerable hand labor of an expensive character.

The primary object of the present invention is to provide an improved rotor for synchronous motors, and also to provide an improved method of manufacturing the rotor.

A more specific object is to provide a rotor in which the magnetic band is completely continuous, i. e. without any abutting ends which might introduce small but effective air gaps of an undesired character.

A still further object is to provide an improved rotor for synchronous motors and a method of making the same, in which a complete rotor band is formed on a punch press and has a permanent circular shape of continuous character when it leaves the press.

The above objects are attained, in brief, by starting out with a flat piece of magnetic material of circular disc form, and bending the edges of the disc into a cup-shaped configuration, and thereafter removing the flat portion of the cup-shaped element to leave the upturned ring portion which constitutes the rotor. Incisions of any desired shape and at any desired position are formed in the rotor while the material is in the flat disc form, so that these incisions appear in the final rotor band.

The invention will be better understood when the specification is perused in connection with the accompanying drawings.

In the drawings:

Figure 1 is a top plan view of a motor which employs the improved rotor of this invention. A portion of the rotor structure has been broken away to show the magnetic circuit, including the shading rings.

Figure 2 is an elevational view of the motor shown in Figure 1, one-half of the view being in cross section.

Figure 3 is a perspective view of one form of the improved rotor, including the arms by which the rotor is mounted on its shaft.

Figure 4:
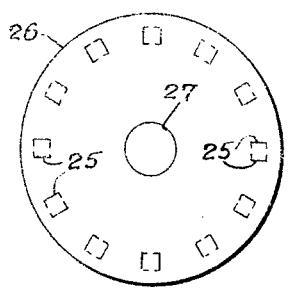
Figure 10:
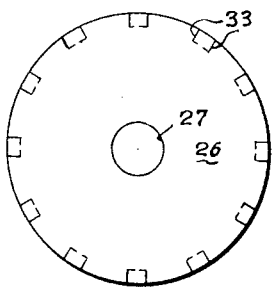
Figure 16:
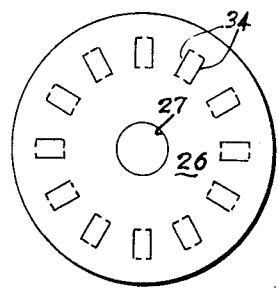
Figure 5:
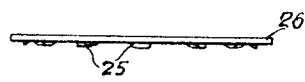
Figure 11:
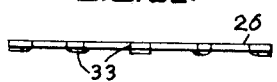
Figure 17:
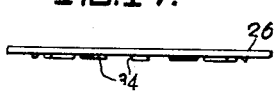

Figures 4 to 9, inclusive, show in the aggregate the successive manufacturing steps by which the improved rotor is fabricated.

Figures 10 to 15, inclusive, illustrate the manufacturing process of another form of rotor.

Figures 16 to 21, inclusive, show a similar process in connection with a third modified form of the improved rotor.

The use of the improved rotor has been typically illustrated in Figures 1 and 2 in connection with a synchronous motor of the annular air gap type. In these figures reference numeral 1 designates a magnetic tubular hub having reduced diameter portions 2, 3, upon which are mounted the outer and inner field pole assemblies. The outer field pole structure consists of a disc 4 having an aperture by which it is mounted on the portion 2 of the hub 1, and having axially extending pole pieces 5, 6 disposed alternately in a cylindrical path about the hub 1. The pole pieces 5 and 6 are preferably arranged in pairs around the periphery of the disc. The alternate pole pieces 6 are of greater width than the pole pieces 5, and are shaded by an undulating ring 7 of non-magnetic material such as copper. This ring passes over the outer surfaces of the pole pieces 5 and therefore does not shade them. However, the shading ring is provided with undulating portions 8 which pass around three sides of the pole pieces 6 to shade these pole pieces, thus providing a phase lag when the field structure is magnetized by an alternating flux.

The inner pole piece assembly consists of a pair of star-shaped discs 9, 10 (Figure 2), having an aperture by which they are mounted on the portion 3 of the hub 1. The discs 9, 10 are provided with pole pieces 11, 12, respectively, which extend outwardly. The pole pieces 11 are bent slightly downward at their tips, while the pole pieces 12 are bent upwardly to give a dished appearance, as is clearly indicated in Figure 2. A shading ring 13, fabricated of copper and having an undulating ribbon-like configuration, is threaded loosely over the pole pieces 12, and then extends under the adjacent pole pieces 11 about three sides thereof in order to shade these pole pieces and therefore to provide a magnetic phase lag when the field structure is magnetized by an alternating flux. In order to improve the operation of the motor it is desirable that the shaded radical pole pieces 11 and the shaded axial pole pieces 5 shall be of somewhat greater width than the corresponding unshaded pole pieces 12 and 6, respectively. The field structure formed by the radial pole pieces 11, 12 and the axial pole pieces 5, 6 is magnetized by a field coil 14 wound on a drum 16 of insulating material and contained between a pair of insulating webs 17. There is a pair of leads (not shown) connected to opposite sides of the coil 14 and adapted to be connected to a suitable source of alternating current.

The magnetic hub 1 is provided with an axial bore 18, plugged at each end by three or more washers 19. The washers 19 have an opening at the center for receiving the shaft 20 of a rotating disc 21, made of light material such as aluminum and provided with equi-distantly spaced openings 22 (Figure 3). These openings are provided mainly to cut down the weight of the metal. The disc 21 is secured to the shaft 20, preferably through a hub member 23 which has a downwardly extending shoulder 24 bearing against the uppermost thrust washer 19. The material of the disc 21 between the openings 22 constitutes the arms which carry at their extremities, in a manner which will be described presently, a cylindrical band of magnetic material which forms the rotor 24ª or rotating element of the motor.

The outwardly extending pole pieces 11, 12 terminate short of the inner surfaces of the axially extending pole pieces 5, 6 to leave an annular gap, and the diameter of the rotor 24ª and its thickness are such as to extend within this gap. As shown in Figure 3, the rotor band has a number of axially extending incisions or slits, indicated at 25, appearing in pairs to magnetically isolate a portion of the rotor band between each pair of incisions. These portions become permanently magnetized and constitute virtual pole pieces which react with the pole piece pairs 11, 6, also 12, 5 in such a way as to cause rotation of the rotor when the coil 14 is energized by alternating current. The distance between the slits of each pair is preferably the same as the width of the shaded pole pieces 11, 5. It will be understood that the shading rings 7, 13 constitute short-circuiting windings of such a character as to produce a rotating field.

Typical processes by which the rotor shown in Figure 3 can be made are illustrated in the three groups of Figures 4 to 9, 10 to 15 and 16 to 21. Referring to these figures, particularly Figure 4, a disc 26 of magnetic material of circular configuration and having an opening 27 is first provided. This disc is preferably punched out of sheet magnetic metal in strip form, and at the time the round punching is made the slits 25 are also provided. There are as many pairs of slits as pairs of poles—in the case illustrated twelve pairs. The slits are arranged on opposite sides of a radial line parallel therewith, starting from a point inside of the peripheral edge and extending for a predetermined distance toward the center of the punching. In order to assure a complete break of the metal at each of the slits, that metal portion between the slits is pressed downwardly out of line with the plane of the disc, the break in the metal occurring only at the positions of the slits. Thereafter the pressed-down portions or tongues (Figure 5) are re-bent into alignment with the plane of the disc, leaving merely the slits 25.

Figure 6:
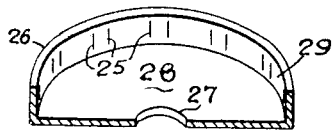
Figure 12:
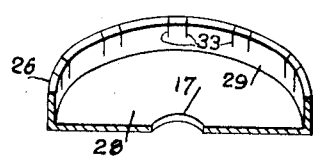
Figure 18:
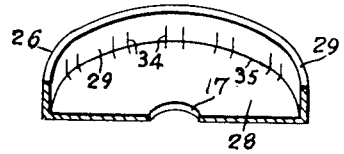
Figure 7:
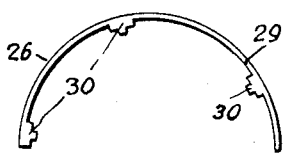
Figure 8:
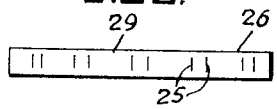
Figure 14:
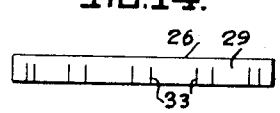
Figure 20:
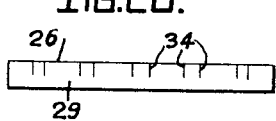

The next step in the process is to form the disc into a cup-shape, as indicated in Figure 6, having a flat portion 28 and an axially extending portion 29 of continuous configuration. This forming step may be produced by the use of forming dies in a press. The width of the portion 29 corresponds to the desired width of the rotor. The flat portion 28 is next removed by cutting dies, these dies being so formed as to leave a plurality of inwardly extending tabs or lugs 30, by which the rotor is secured to the arms 31 of the aluminum disc 21 (Figure 3). It will be understood that in Figure 7 only one-half of the finished rotor has been illustrated so that there may be provided six tabs or projections 30. The edge view of the finished rotor is shown in Figure 8 and the perspective in Figure 9.

It will be noted that the slits 25 are symmetrically positioned with respect to the upper and lower edges of the rotor, and that these slits do not extend out to the edge but have a length less than the thickness of the rotor. A preferred way in which the rotor is secured to its supporting spider is shown in Figures 2 and 3. The arms 31 of the disc 21 extend radially from the center of the rotor and are secured at the center to the hub 23 in any suitable manner, for example, by peening. The outer ends of the arms 31 terminate in an element which is provided with a pair of slits 32, and the portion between the slits is bent downwardly so as to extend along the inner surfaces of the tabs 30. The upper or unbent portions of the arms 31 bear against the upper surfaces of the tabs, the arrangement being such that the ends of the arms strongly grip the tabs and thus secure the rotor to its shaft 20.

In operation, assuming that the rotor shaft has been placed in position in the bearings 19 and the rotor element is positioned in the annular groove between the sets of radial pole pieces 11, 12 and the axial pole pieces 5, 6, the energization of the coil 14 by alternating current will set up a rotating field which reacts on the rotor in such a way as to rotate the latter. The rotor portions between each pair of adjacent slits 25 become permanently magnetized, due to the magnetic isolating effects of the slits, and these portions do not change polarity in either starting or when the rotor has reached synchronism. A motor having a rotor, in which slits of the character described are provided, has been found to give a strong starting characteristic, as well as strong synchronizing effects to maintain the rotor in step with the frequency of the voltage applied to the coil. It will be noted that the rotor is of unbroken continuity, and consequently presents a uniform cross section to all parts of the magnetic field as it rotates, thus giving to the motor more uniform starting and running characteristics than in the case of motors in which the rotor is formed of a band of magnetic material having ends abutting one another. Even if these ends are welded together to increase the continuity of the band, the welding material may not have magnetic qualities, so that there is a virtual air gap set up between the welded ends of the band. In any case the metal at the weld presents a section to the pole pieces which may be of greater thickness than the remaining portions of the rotor, thus introducing irregularities of performance.

Figure 13:
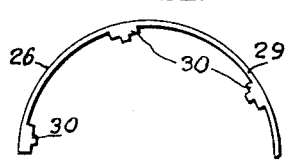
Figure 19:
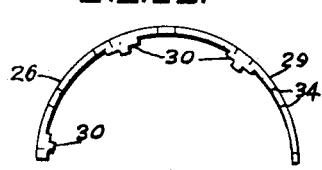
Figure 15:
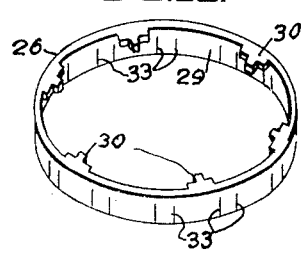

Instead of locating the slits 25 at positions intermediate the upper and lower edges of the rotor, the slits may extend from either the upper or the lower edges of the rotor and still use my improved punching-out process for fabricating the rotor. In Figures 10 to 15 there is shown a rotor in which the slits start from one edge and extend toward the other edge, but stop short of said other edge. In this case a blank similar to that shown in Figure 4 is employed, but the slits 33 run out to the edge of the blank and do not extend as far inwardly as in the case of Figure 4. The section between these slits is bent downwardly to assure a clean break at the slits, and then these tongues are bent back into the stock material, after which the disc is formed cup-shape (Figure 12) and later punched out to leave the tabs 30, as indicated in Figures 13 and 15. It will be noted in Figure 15 that the slits 33 extend upwardly from the edge of the rotor opposite the tabs or projections 30.

Figure 9:
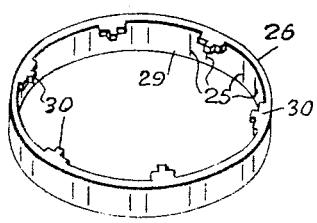
Figure 21:
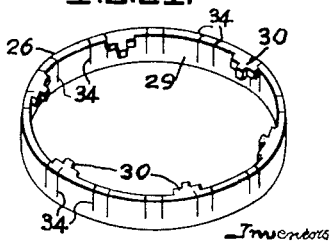

In Figures 16 to 21 we have shown the slits extending downwardly from the same edge of the rotor at which the tabs 30 are located, and thus at the opposite edge from that shown in Figures 10 to 15. As will be seen in Figure 16, the slits 34 start at their outer ends from positions well inside the periphery of the disc, and extend for a considerable distance toward the center of the disc. After the disc has been formed into cup-shape (Figure 18) and the flat portion 28 punched out to leave the tabs 30, the slits 34 will extend from the upper edge of the rotor, as seen in Figure 21, to a distance just short of the lower edge. It will be noted that the line 35 (Figure 18), at which the bend occurs, crosses the slits so that these slits extend as far as the edge of the rotor when the flat portion 28 has been removed. The use of the slits positioned intermediate the upper and lower edges of the rotor, as illustrated in Figure 9, has been found to give slightly better results than in the case of those rotors in which the slits extend to either one edge or the other of the rotor. For certain applications of the motor, the rotors shown in Figures 15 and 21 have some advantages over the rotor shown in Figure 9.

It will be understood that we desire to comprehend within our invention such modifications as come within the scope of the claims and the invention.

Having thus fully described our invention, what we claim as new and desire to secure by Letters Patent, is:

1. In a method of fabricating rotors for synchronous motors, the steps of forming spaced incisions near the edge of a flat circular piece of rotor material, said incisions extending in a general radial direction, then bending the flat piece into a cup-shape with the bend at such a position that the incisions occur between the bend and the edge of said piece, then cutting the flat portion of the cup-shaped material to leave integral lugs projecting inwardly from the edge of the bent portion, and then removing the metal cut from the flat portion of the cup-shaped member to leave a rotor ring of continuous circular form with incisions extending along the length of the ring and about its periphery.

2. In a method of fabricating rotors for synchronous motors, the steps of forming spaced incisions near the edge of a flat circular piece of rotor material, then bending the flat piece into a cup-shape with the bend at such a position that the incisions occur between the bend and the edge of said pieces, then cutting the flat disc portion of the cup-shaped material to leave integral lugs projecting inwardly from the edge of the bent portion, and then removing the material cut from the flat disc portion of the cup-shaped member to leave a rotor ring of continuous circular form with the incisions extending along the length of the ring and about its periphery.

3. The method of fabricating rotors for synchronous motors, the steps of punching spaced incisions in a flat circular element of rotor material, the incisions extending from a position near the periphery of the element toward the center, then bending the element into a cup-shape configuration with the bend at such position that the incisions occur between the bend and the edge of the element, the width of the bent portion representing the width of the finished rotor, then cutting the flat circular portion to leave integral lugs projecting inwardly from the edge of the bent portion, and then removing the metal cut from the flat circular portion of the element to leave a rotor ring of unbroken continuity, said incisions starting and ending at positions removed from the edges of the rotor.

4. In a method of fabricating rotors for synchronous motors, the steps of punching spaced incisions in a flat circular element of rotor material, the incisions starting at the position removed from the periphery of the element and extending toward the center of the element, then bending the element into a cup-shape configuration with the bend at such a position that the incisions occur between the bend and the edge of the element, the width of the bent portion representing the width of the finished rotor, then cutting the flat circular portion of the cup-shaped element to leave integral lugs projecting inwardly from the edge of the bent portion, and then removing the metal cut from the flat portion of the cup-shaped element to leave a rotor ring of unbroken continuity, said incisions starting at the position removed from one edge of the rotor and extending as far as the other edge of the rotor.

5. In a method of fabricating rotors for synchronous motors, the steps of punching spaced incisions in a flat circular element of rotor material, the incisions extending from the periphery of the metal piece toward the center, then bending the material into a cup-shaped configuration, the width of the bent portion representing the width of the finished rotor and the bend in the material occurring at the edge of the rotor opposite the edge from which the incisions extend, then cutting the flat circular portion of the cup-shaped configuration to leave integral lugs projecting inwardly from the edge of the bent portion, and then removing the material cut from the flat portion of the cup-shaped element to leave a ring of unbroken continuity and to leave lugs which project inwardly from the edge of the rotor opposite the edge from which the incisions extend.

6. In a method of fabricating rotors for synchronous motors, the steps of punching spaced incisions in a flat circular element of rotor material, the incisions extending from a position removed from the periphery of said element to a position near the center of said element, then bending the material into a cup-shaped configuration, the width of the bent portion representing the width of the finished rotor, the bend in the metal occurring along a line which passes through the incisions, then cutting the flat circular portion of the cup-shaped element to leave integral lugs projecting inwardly from the edge of the bent portion, and then removing the metal cut from the flat portion of the cup-shaped element to leave a rotor ring of unbroken continuity and to leave inwardly projecting lugs at the edge of the rotor from which the incisions start.

7. In a method of fabricating rotors for synchronous motors the steps of forming spaced incisions removed from the central portion of a flat circular element of rotor material, said incisions extending in a general radial direction, then bending the flat piece into a cup-shape with the bend at such a position that the incisions occur in part at least between the bend and the edge of said piece, then cutting the flat circular portion of the cup-shaped element to leave integral lugs projecting inwardly from the edge of the bent portion, and then removing the material cut from the flat portion of the cup-shaped element to leave a rotor ring of continuous circular form with the incisions extending along the length of the ring and spaced from at least one edge of the ring.

WILLIAM L. HANSEN.
IRA N. HURST.